US012757012B2

(12) United States Patent
Helms

(10) Patent No.: US 12,757,012 B2
(45) Date of Patent: Oct. 6, 2026

(54) METHODS AND SYSTEMS FOR SECURE COMMUNICATION BETWEEN TWO OR MORE APPLIANCES

(71) Applicant: Haier US Appliance Solutions, Inc., Wilmington, DE (US)

(72) Inventor: Chad Michael Helms, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 287 days.

(21) Appl. No.: 18/460,170

(22) Filed: Sep. 1, 2023

(65) Prior Publication Data

US 2025/0080977 A1 Mar. 6, 2025

(51) Int. Cl.

| | |
|---|---|
| ***H04W 12/037*** | (2021.01) |
| ***H04L 9/14*** | (2006.01) |
| ***H04L 9/30*** | (2006.01) |
| ***H04L 12/28*** | (2006.01) |
| ***H04W 76/14*** | (2018.01) |

(52) U.S. Cl.

CPC ............. *H04W 12/037* (2021.01); *H04L 9/14* (2013.01); *H04L 9/30* (2013.01); *H04L 12/2807* (2013.01); *H04W 76/14* (2018.02); *H04L 2012/2841* (2013.01); *H04L 2012/285* (2013.01)

(58) Field of Classification Search

CPC .................................................. H04L 12/2807

See application file for complete search history.

(56) References Cited

U.S. PATENT DOCUMENTS 9,843,929 B2 12/2017 Zimmerman et al.
10,574,475 B2 * 2/2020 Drake ................. H04L 12/2809
10,735,467 B2 8/2020 Yang et al.
2005/0188193 A1 * 8/2005 Kuehnel ................. H04L 12/66 713/155
2006/0174102 A1 * 8/2006 Smith ............... H04W 12/0471 713/150

(Continued)

FOREIGN PATENT DOCUMENTS

AU 2017225254 A1 * 8/2018 ......... H04L 12/2809
CN 115268326 A 11/2022

*Primary Examiner* — Yonas A Bayou
(74) *Attorney, Agent, or Firm* — Dority & Manning, P.A.

(57) ABSTRACT

A method of securing communication between a first domestic appliance and a second domestic appliance through a remote server may include establishing communication between the first domestic appliance and the remote server through a local wireless network, which may include receiving a first public key. The method may also include establishing communication between the second domestic appliance and the remote server through the local wireless network, which may include receiving a second public key. The method may further include generating an encryption key at the first and second domestic appliances following establishing communication between the first domestic appliance and the remote server and establishing communication between the second domestic appliance and the remote server. The method may still further include directing use of the encryption key in intra-appliance communication over a secondary connection channel apart from the local wireless network.

9 Claims, 5 Drawing Sheets

(56) References Cited

U.S. PATENT DOCUMENTS

| | | | | |
|---|---|---|---|---|
| 2015/0172061 | A1* | 6/2015 | Lee | H04W 12/04<br>713/176 |
| 2017/0055148 | A1* | 2/2017 | Zimmerman | H04L 63/0428 |
| 2017/0195302 | A1* | 7/2017 | Roberts | H04L 63/107 |
| 2017/0324717 | A1* | 11/2017 | Kravitz | H04L 63/08 |
| 2019/0281449 | A1 | 9/2019 | Luo | |
| 2019/0363904 | A1* | 11/2019 | Drake | H04L 63/0442 |
| 2020/0028672 | A1 | 1/2020 | Tang | |
| 2020/0128069 | A1 | 4/2020 | Chen et al. | |
| 2020/0313877 | A1* | 10/2020 | Mondello | H04L 9/50 |
| 2020/0336896 | A1* | 10/2020 | Lovich | H04W 12/069 |
| 2021/0297280 | A1 | 9/2021 | Jeong et al. | |
| 2021/0409201 | A1* | 12/2021 | Mondello | H04L 9/0637 |
| 2022/0070008 | A1* | 3/2022 | Howard | H04L 9/0836 |
| 2023/0037251 | A1* | 2/2023 | Xu | H04W 4/70 |
| 2024/0015516 | A1* | 1/2024 | Lovich | H04W 12/069 |

* cited by examiner

METHODS AND SYSTEMS FOR SECURE COMMUNICATION BETWEEN TWO OR MORE APPLIANCES

FIELD OF THE DISCLOSURE

The present subject matter relates generally to domestic appliances that can connect to a home network or a remote network, such as the internet; and more particularly, to domestic appliances that can connect to each other for secure communication.

BACKGROUND OF THE DISCLOSURE

Domestic (e.g., household) appliances are generally used for a variety of tasks by a variety of users. For example, a household may include such appliances as laundry appliances (e.g., a washing machine or dryer appliance), kitchen appliances (e.g., a refrigerator, a microwave, a coffee maker, user engagement device, etc.), along with room air conditioners and various other appliances.

Some domestic appliances can also include features for connecting to and communicating over a wireless network. Such communication may provide connected features on the domestic appliances to permit the domestic appliance to communicate with a personal device, smart home systems, or a remote database such as a cloud server.

Existing domestic appliances that can connect to a wireless network or communicate with each other often communicate through common channels or protocols, such as a short-range wireless standards or personal area networks in the 2.4 GHz to 2.48 GHz frequency bands (e.g., BLUETOOTH® or BLE). Typically, BLUTOOTH or BLE connections do not provide an authentication process by default. As a result, exchanged data or undesired control of the appliances by non-authorized individuals may be possible. In the past, attempts have been made to secure such connections, such as by printing QR codes or password codes near/on one of the appliances.

Unfortunately, existing systems and methods suffer from various drawbacks. For instance, multiple processes using multiple user interfaces may be required in order to establish a connection between two or more appliances. Printed QR or password codes may be susceptible to wear, obfuscation, or removal. Moreover, some users, especially less-technologically-adept individuals, may have difficult performing the necessary processes and for separately connecting multiple devices.

Accordingly, there exists a need for an appliance that can be connected to a secured wireless network and added to a user account in an easier or more secure manner.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a method of securing communication between a first domestic appliance and a second domestic appliance through a remote server is provided. The method may include establishing communication between the first domestic appliance and the remote server through a local wireless network. Establishing communication between the first domestic appliance and the remote server may include receiving a first public key. The method may also include establishing communication between the second domestic appliance and the remote server through the local wireless network. Establishing communication between the second domestic appliance and the remote server may include receiving a second public key. The method may further include generating an encryption key at the first and second domestic appliances following establishing communication between the first domestic appliance and the remote server and establishing communication between the second domestic appliance and the remote server. The method may still further include directing use of the encryption key in intra-appliance communication over a secondary connection channel apart from the local wireless network.

In another exemplary aspect of the present disclosure, a method of securing communication between a first domestic appliance and a second domestic appliance through a remote server is provided. The method may include receiving a first appliance ID and a first public key of the first domestic appliance. The method may also include receiving a second appliance ID and a second public key of the second domestic appliance. The method may further include transmitting the first appliance ID and the first public key to the second domestic appliance and transmitting the second appliance ID and the second public key to the first domestic appliance. The method may still further include generating an encryption key at the first and second appliances using the first and second public keys. The method may yet further include directing use of the encryption key in intra-appliance communication over a secondary connection channel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
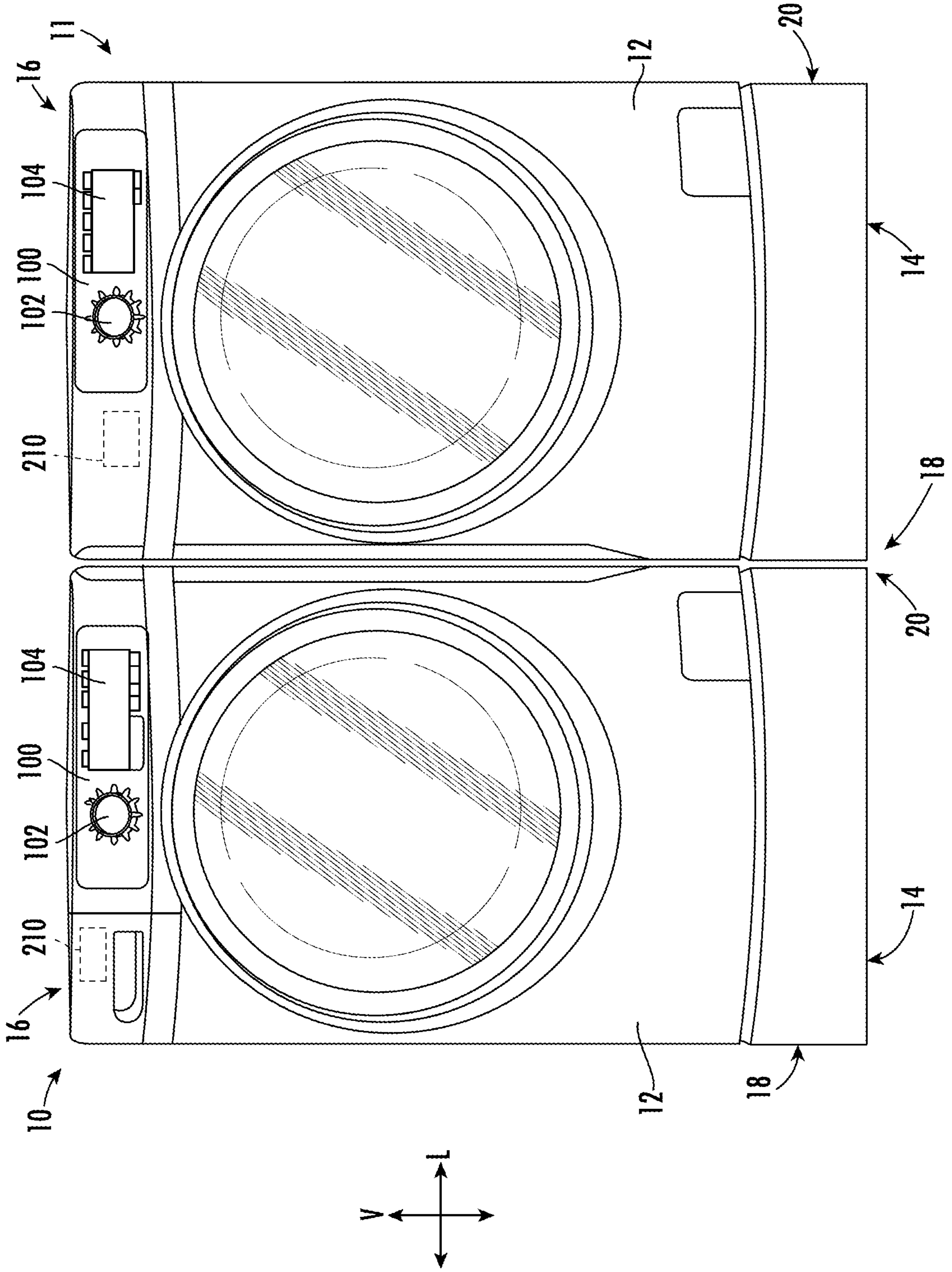
FIG. 1 provides a front, elevation view of laundry appliances in accordance with exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
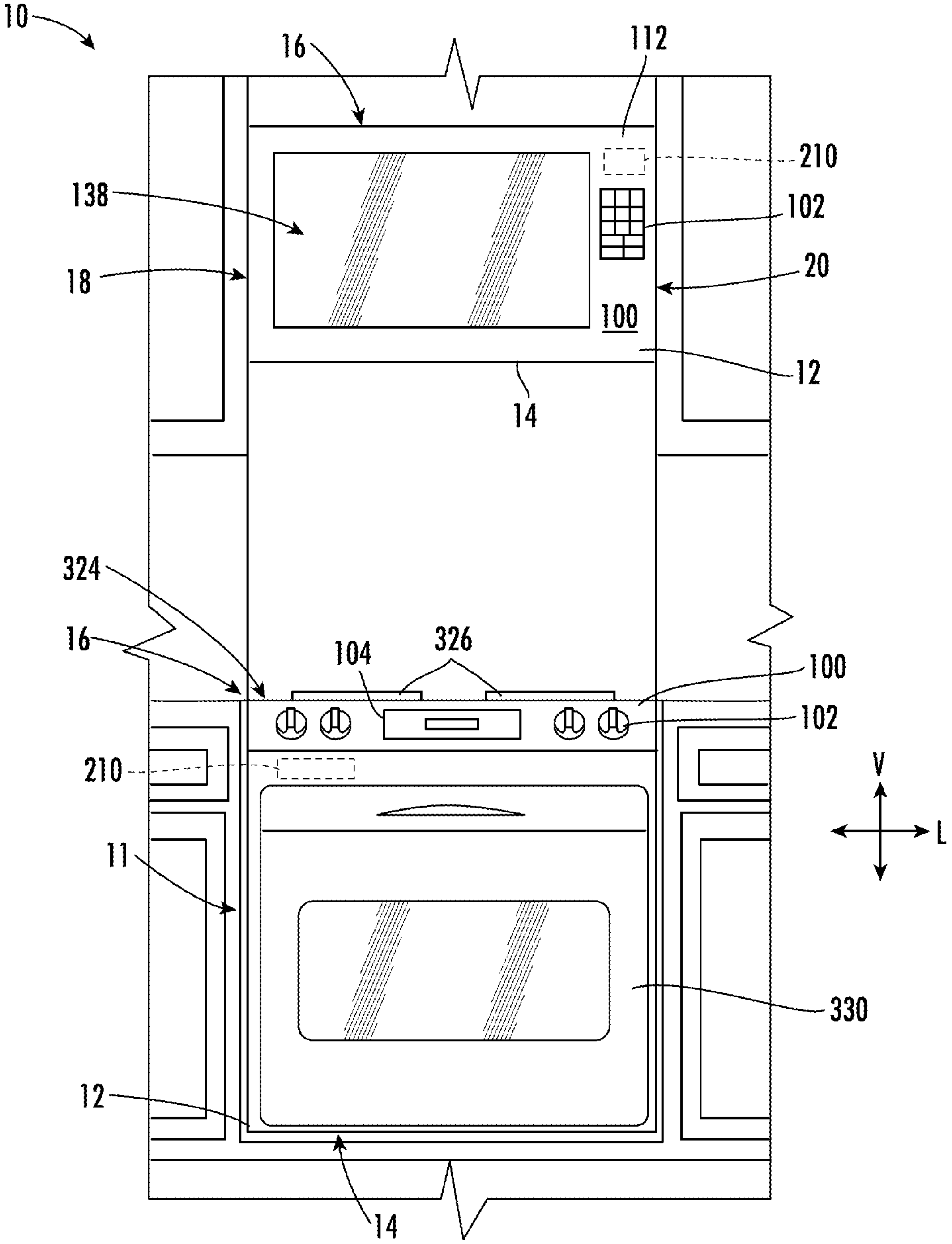
FIG. 2 provides a front, elevation view of kitchen appliances in accordance with exemplary embodiments of the present disclosure.

As may be seen in FIGS. 1 and 2, in accordance with one or more embodiments of the present disclosure, one or more appliances, such as a first appliance 10 and a second appliance 11, may be provided. The illustrated group of two appliances is provided by way of example only. Various embodiments of the present subject matter may also include only one or three or more appliances.

As generally shown throughout FIGS. 1 and 2, each appliance 10 and 11 includes a cabinet 12 that defines a vertical direction V, a lateral direction L, and a transverse direction T that are mutually perpendicular. Each cabinet 12 extends between a top side 16 and a bottom side 14 along the vertical direction V. Each cabinet 12 also extends between a left side 18 and a right side 20 (e.g., along the lateral direction L) and a front side 22 and a rear side 24 (e.g., along the transverse direction T).

Each appliance 10 and 11 may include a user interface panel 100 and a user input device 102, which may be positioned on an exterior of the cabinet 12. The user input device 102 is generally positioned proximate to the user interface panel 100, and in some embodiments, the user input device 102 is positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, one or more devices may include a controller 210. For instance, each appliance 10 and 11 may include a separate controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliances 10 and 11. Operation of the appliances 10 and 11 may each be regulated by the respective controller 210 that is operatively coupled to the corresponding user interface panel 100. A user interface panel 100 may for example provide selections for user manipulation of the operation of an appliance (e.g., via user input device 102 or display 104). In response to user manipulation of the user interface panel 100 or user input device 102, the controller 210 may operate various components of the appliance 10 or 11. Each controller 210 may include a memory and one or more microprocessors, CPUs, or the like, such as general or special purpose microprocessors operable to execute programming instructions or micro-control code associated with operation of the appliance 10 or 11. The memory may represent random access memory such as DRAM, or read only memory such as ROM or FLASH. In some embodiments, the processor executes programming instructions stored in memory. The memory may be a separate component from the processor or may be included onboard within the processor. Alternatively, a controller 210 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

The controller 210 may be programmed to operate the respective device or appliance (e.g., 10 or 11) by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions or instructions (e.g. performing the methods, steps, calculations, etc. and storing relevant data, as disclosed herein). It should be noted that controllers 210 as disclosed herein are capable of, and may be operable to perform, any methods and associated method steps (e.g., as, or as part of, a secure communication operation) as disclosed herein.

In some embodiments, for example, as illustrated in FIG. 1, a pair of laundry appliances may be provided as the first appliance 10 and the second appliance 11. In the exemplary embodiment illustrated in FIG. 1, the first appliance 10 may be a washing machine appliance and the second appliance 11 may be a dryer appliance. In embodiments such as illustrated in FIG. 1, the user input device 102 of each appliance 10 and 11 may be positioned on the user interface panel 100. The embodiment illustrated in FIG. 1 also includes a display 104 on the user interface panel 100.

FIG. 2 illustrates another exemplary embodiment of a group of appliances where the first appliance 10 or the second appliance 11 is/are kitchen appliances. In this example, the first appliance 10 is a microwave oven appliance that is generally positioned above the second appliance 11, which is a cooktop appliance (e.g., along the vertical direction V).

Microwave oven appliance as first appliance 10 includes a cabinet 12. A cooking chamber is defined within the cabinet 12 of the microwave oven appliance. The cooking chamber is accessible via a door 112 and viewable through a window 138 in the door 112. The microwave oven appliance is configured to heat articles (e.g., food or beverages) within the cooking chamber using electromagnetic radiation. The microwave oven appliance may include various components that operate to produce the electromagnetic radiation, as is generally understood. For example, the microwave oven appliance may include a magnetron (such as, for example, a cavity magnetron), a high voltage transformer, a high voltage capacitor, and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

As shown, cooktop appliance as second appliance 11 includes a chassis or cabinet 12 that extends along the vertical direction V between a top side 16 and a bottom side 14. The cooktop appliance can include a cooktop surface 324 having one or more heating elements 326 for use in, for example, heating or cooking operations. In exemplary embodiments, cooktop surface 324 is constructed with ceramic glass. In other embodiments, however, cooktop surface 324 may include any another suitable material, such as a metallic material (e.g., steel) or another suitable non-metallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In various embodiments, the heating elements 326 may include one or more of a gas burner element, resistive heat element, radiant heat element, induction element, or another suitable heating element.

In some embodiments, the cabinet 12 of the cooktop appliance may be insulated and may define a cooking chamber selectively enclosed by a door 330. One or more heating elements (e.g., top broiling elements or bottom baking elements) may be positioned within cabinet 12 of the cooktop appliance to heat the cooking chamber. Heating elements within the cooking chamber may be provided as any suitable element for cooking the contents of cooking chamber, such as an electric resistive heating element, a gas burner, a microwave element, a halogen element, etc. Thus, the cooktop appliance may be referred to as an oven range appliance. As will be understood by those skilled in the art, the cooktop appliance is provided by way of example only, and the present subject matter may be used in the context of any suitable cooking appliance, such as a double oven range appliance or a standalone cooktop (e.g., fitted integrally with a surface of a kitchen counter). Thus, the exemplary embodiments illustrated and described are not intended to limit the present disclosure to any particular cooking chamber or heating element configuration, unless explicitly indicated as such.

As illustrated, a user interface panel 100 may be provided on the cooktop appliance. Although shown at front portion of the cooktop appliance, another suitable location or structure (e.g., a backsplash) for supporting user interface panel 100 may be provided in alternative embodiments. In some embodiments, user interface panel 100 includes input components or controls 102, such as one or more of a variety of electrical, mechanical, or electro-mechanical input devices. Controls 102 may include, for example, rotary dials, knobs, push buttons, and touch pads. A controller 210 is in communication with user interface panel 100 and controls 102 through which a user may select various operational features and modes and monitor progress of the cooktop appliance. In additional or alternative embodiments, user interface panel 100 includes a display component, such as a digital or analog display in communication with a controller 210 and configured to provide operational feedback to a user. In certain embodiments, user interface panel 100 represents a general purpose I/O ("GPIO") device or functional block.

As shown, controller 210 is communicatively coupled (i.e., in operative communication) with user interface panel 100 and its controls 102. Controller 210 may also be communicatively coupled with various operational components of cooktop appliance 300 as well, such as heating elements (e.g., 326, 332), sensors, and the like. Input/output ("I/O") signals may be routed between controller 210 and the various operational components of the cooktop appliance. Thus, controller 210 can selectively activate and operate these various components. Various components of the cooktop appliance are communicatively coupled with controller 210 via one or more communication lines such as, for example, conductive signal lines, shared communication busses, or wireless communications bands.

According to various embodiments of the present disclosure, the appliances 10 or 11 may take the form of any of the examples described above, or may be any other domestic appliance where it is desired to have improved ease of secure communication (e.g., direct communication) between at least two appliances (e.g., appliances 10 and 11). Such appliances may be commissioned or added (e.g., previously added) a common user account, which may include a list of appliances "commissioned" to that account or the IP address that each of those appliances uses to communicate to a remote server. Thus, it will be understood that the present subject matter is not limited to any particular domestic appliance and may include one or more laundry appliances (e.g., a washing machine or dryer appliance) or kitchen appliances (e.g., a refrigerator, a microwave, a coffee maker, user engagement system, etc.).

Figure 3:
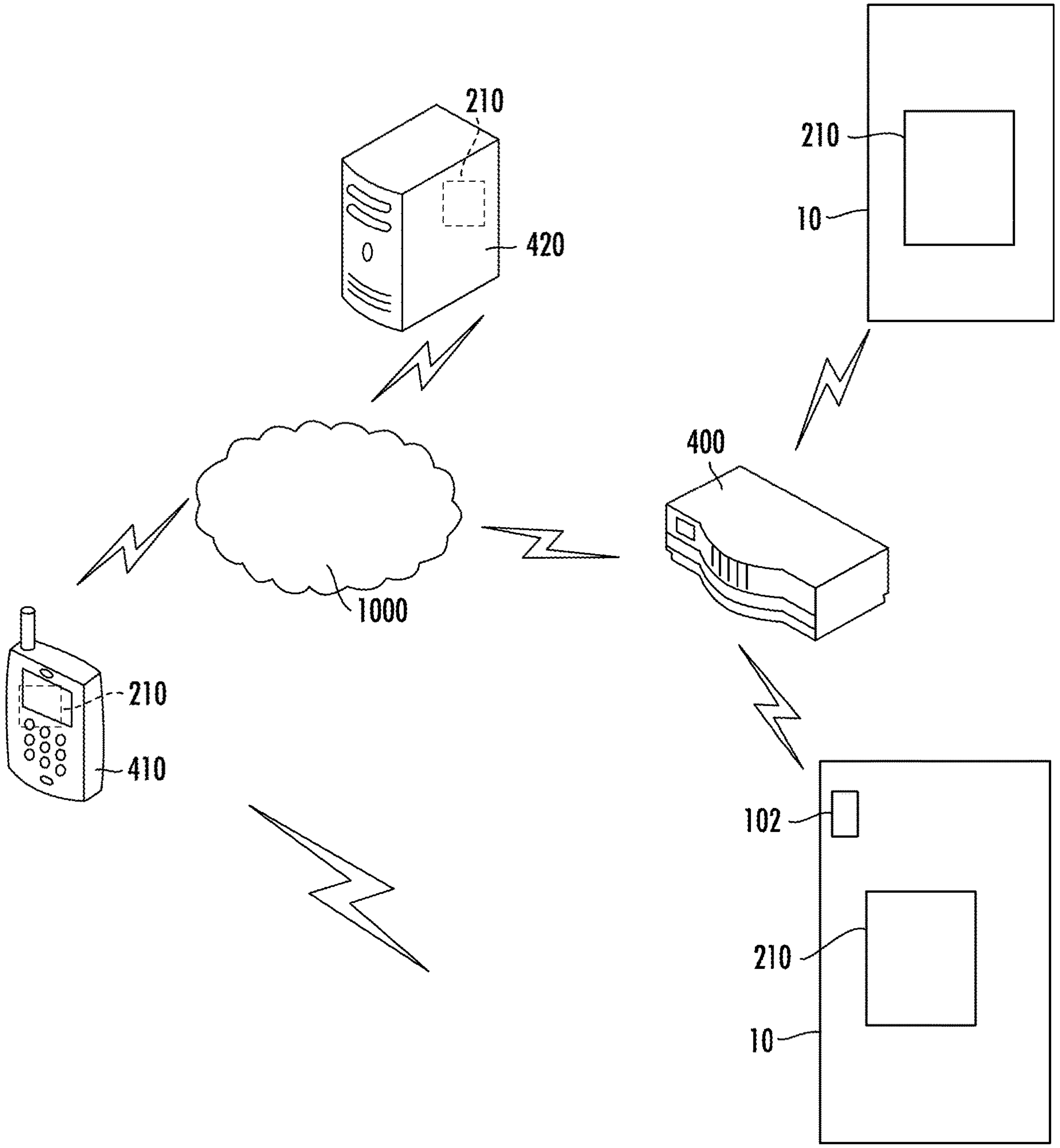
FIG. 3 provides a schematic view of multiple appliances being indirectly connected with one or more devices according to exemplary embodiments of the present disclosure.
Figure 4:
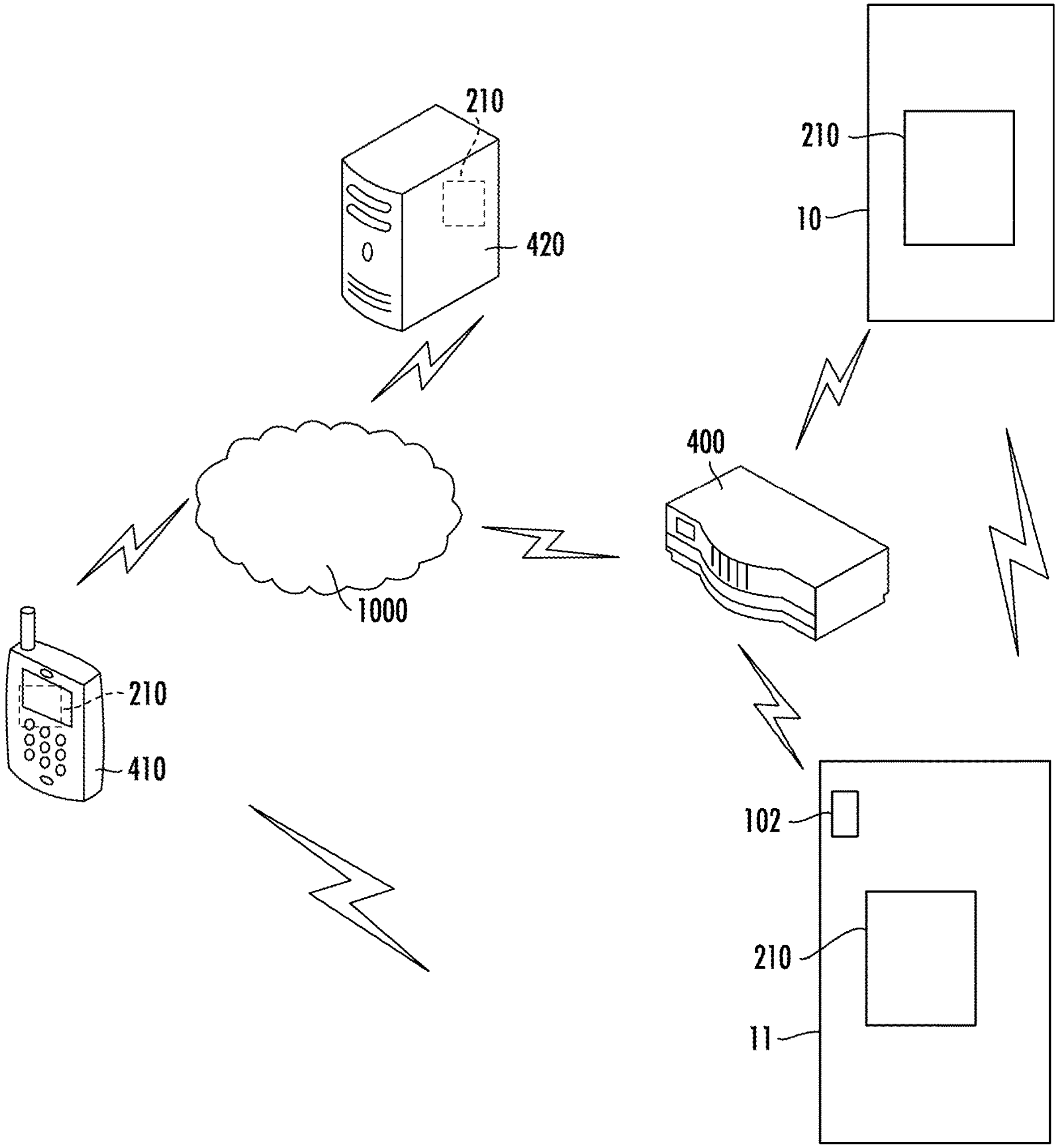
FIG. 4 provides a schematic view of multiple appliances being directly connected with each other according to exemplary embodiments of the present disclosure.

Turning now generally to FIGS. 3 and 4, two or more appliances (e.g., first appliance 10 or second appliance 11-FIGS. 1 and 2) may be configured to communicate with one or more separate, external devices. For instance, appliances 10, 11 may be configured to communicate with each other, a remote user interface device 410, or a remote server 420, either directly or via one or more intermediate networks (e.g., a wide area network 1000, such as the internet). In other words, a controller 210 of one appliance (e.g., second appliance 11) may be configured to communication with a separate controller 210 of another appliance (first appliance 10), In some embodiments, the appliances 10 and 11 can access the wide area network 1000 via an access point, such as a modem or router 400, which may be part of a local, wireless network (e.g., WI-FI® or wireless network having a frequency between 1 GHz and 6 GHz).

The remote user interface device 410 may be a laptop computer, smartphone, tablet, personal computer, wearable device, smart home system, or various other suitable devices including a user interface (e.g., buttons or touchscreen display). In some embodiments, the remote user interface device 410 includes a controller having a memory (e.g., non-transitive storage media) for storing and retrieving programming instructions. For example, the remote user interface device 410 may be a smartphone operable to store and run applications (i.e., "apps") and may include a remote user interface provided as a smartphone app. During use, the appliances 10, 11 may be in communication with the separate external device 410 or 420 through various possible communication connections and channels, such as but not limited to wireless radio frequency (RF) channels (e.g., ZIGBEE®, BLUETOOTH®, WI-FI®, etc.) or any other suitable communication connection.

Methods and systems according to the present disclosure advantageously provide an easy or secure user experience for secure appliance communication (e.g., between two or more appliances 10 and 11). For example, ensuring secure communication between appliance 10 and appliance 11 may include connecting the appliances 10 and 11 to a wireless (e.g., RF, WI-FI®, etc.) network or adding the appliances 10 and 11to a user account on a remote server 420.

FIG. 3 provides a schematic view of appliances 10 and 11 communicating with a remote server 420, such as during or following a commissioning operation (e.g., prior to secure communication of the appliances 10 and 11 with each other). In particular, the remote server 420 (e.g., a controller 210 thereof) may communicate with the controller 210 of each appliance 10 and 11 through a network interface on the controller 210, router 400, or network 1000. In some embodiments, commissioning of the appliances 10 and 11 appliance 110 (e.g., commissioning operation) is initiated following or in response to receiving a network credential (e.g., a password for a local wireless network or router 400, which may be supplied to the corresponding controller 210 directly by a user, such as from a user interface of appliance 10 or 11 or, alternatively indirectly, such as through device 410 or another appliance already connected to the network or router 400).

Optionally, one or both appliances 1- and 11 may be a previously-commissioned appliance that is connected directly to the router 400 (e.g., to communicate with remote server 420 through the wide area network 1000). First appliance 10 and second appliance 11 may be connected directly to a corresponding local wireless network (e.g., WI-FI® network) maintained by a router 400. Moreover, as commissioned appliance, first and second appliance 10 and 11 may be associated with the user's account and stored as such within the remote server, as is understood.

Following the establishment of communication with the network or router 400, the appliances 10 and 11 may separately submit or request a predetermined portal site (e.g., web address), which may correspond to a site hosted (at least in part) on remote server 420. An appliance identifier (ID) or public key of the appliance 10 or 11 may then be submitted (e.g., with the request to the site or in response to a request from the server 420). A corresponding appliance ID and public key may be sent (e.g., separately or together) from both appliances 10 and 11 (e.g., via network and router 400). Notably, such transmissions may be protected via one or more security layers or protocols, as is understood, such that the transmissions from the appliances 10 and 11 to the server 420 are secure. The appliance identifier is generally provided as a suitable device identifier (e.g., corresponding to or descriptive of an individual model or unit) and may include a universally unique identifier (UUID) associated with the corresponding appliance (e.g., programmed or stored on the corresponding appliance, such as at the controller 210 thereof). For example, the appliance identifier may include a serial number, device-model descriptor (e.g., model name, number, etc.), or media access control (MAC) address, which may be programmed or stored within the controller 210 of appliance 110 (e.g., at the network interface thereof). The public key may be a predetermined key for cryptography (e.g., number or text generated with a cryptographic algorithm based on mathematical problems such as one-way functions), as is understood.

Turning now to FIG. 4, FIG. 4 provides a schematic view of appliances 10 and 11 communicating with a remote server 420 as well as securely communicating with each other. As noted above, the remote server may receive an appliance ID or public key from each of the appliances 10 and 11 (e.g., via network 400). Following receipt of the same, the server 420 may swap or exchange the same. In other words, the remote server 420, having identified that the appliances 10 and 11 are associated with the same user account or that a request for secure direct communication is desired between the two appliances 10 and 11 (e.g., as indicated by a user input at appliance 10, appliance 11, or remote user interface device 410), may transmit an appliance ID or public key of the first appliance 10 to the second appliance 11. Similarly, the remote server 420 may transmit an appliance ID or public key of the second appliance 11 to the first appliance 10.

At each appliance 10 and 11, an encryption key (e.g., shared encryption key) may be generated. For instance, the encryption key may be independently generated at the first appliance 10 and at the second appliance 11. The encryption key may be based on one or more of the public keys. Optionally, the encryption key may further be based on a private key of the appliance 10 or 11 (e.g., which may be held or prevented from exchange with another appliance 11 or 10). As an example, at the first appliance 10, the encryption key may be generated based on the public key of the first appliance 10 (e.g., first public key), the private key of the first appliance 10 (e.g., first private key), and the public key of the second appliance 11 (e.g., second public key). As an additional or alternative example, at the second appliance 11, the encryption key may be generated (e.g., separately from the generation at the first appliance 10) based on the public key of the second appliance 11 (e.g., second public key), the private key of the second appliance 11 (e.g., second private key), and the public key of the first appliance 10 (e.g., first public key).

Generally, generation of the encryption key may be based on any suitable encryption technique, protocol, or algorithm. For instance, the appliance 10 and 11 may generate the encryption key according to a key agreement protocol, such as elliptic-curve Diffie-Hellman (ECDH), allowing two different parties (e.g., appliances 10 and 11) having an elliptic-curve public-private key pair, to establish a shared secret over an insecure channel, as is understood.

Following generation of the encryption key, a new line of communication (e.g., secondary connection channel) may be established between the two appliances 10 and 11 apart from the network 1000. For instance, a direct wireless connection channel may be established, such as a wireless radio frequency (RF) channel between 2.4 gigahertz (GHz) and 2.48 GHz. (e.g., BLUETOOTH), as is understood. Moreover, as would be understood in light of the present disclosure, the encryption key may be used to encrypt (e.g., at one appliance) and decrypt (e.g., at the other appliance) data or information passed through the secondary connection channel. Advantageously, the secure communication may be facilitated without requiring a user to directly intervene or input any code (e.g., printed on the appliances). As is understood, the data passed between the appliances in intra-appliance communication may be any suitable data to influence or enhance operation of the appliances 10 and 11.

Figure 5:
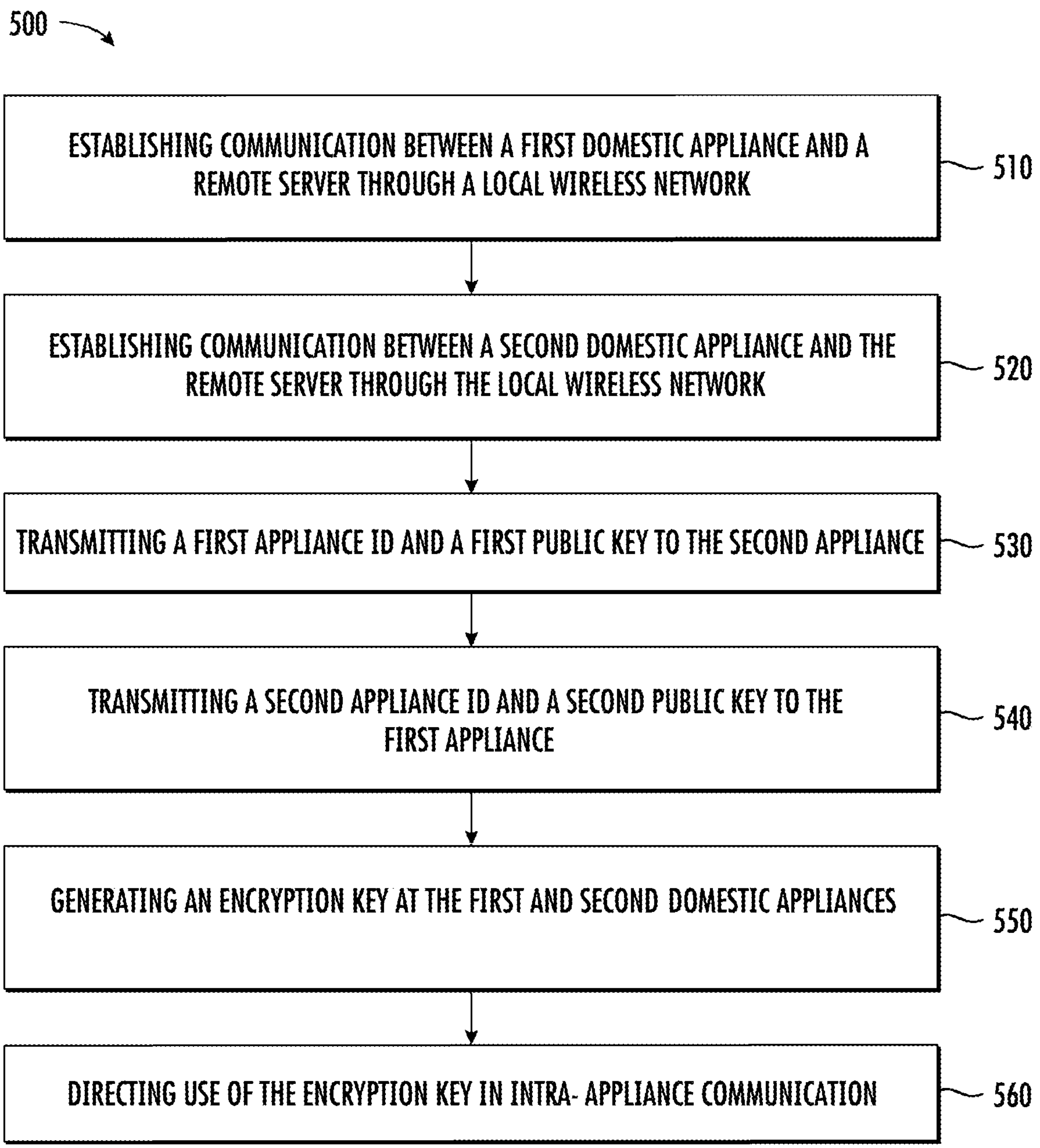
FIG. 5 provides a flow chart illustrating a method of securing communication between a first domestic appliance and a second domestic appliance through a remote server according to exemplary embodiments of the present disclosure.

Turning now to FIG. 5, various methods may be provided for use of a system, appliances (e.g., first appliance 10 or second appliance 11), or remote server (e.g., remote server 420) in accordance with the present disclosure. In general, the various steps of methods (e.g., method 500) as disclosed herein may, in exemplary embodiments, be performed by one or more controllers 210 (e.g., of first appliance 10, second appliance 11, or remote server 420) as part of an operation that a controller 210 is configured to execute (e.g., as, or as part of, a secure communication operation). During such methods, the controller 210 may receive inputs and transmit outputs from various other components or external devices. In particular, the present disclosure is further directed to methods, such as curing communication between a first domestic appliance and a second domestic appliance.

FIG. 5 depicts steps performed in a particular order for purpose of illustration and discussion. Those of ordinary skill in the art, using the disclosures provided herein, will understand that steps of any of the methods disclosed herein can be modified, adapted, rearranged, omitted, or expanded in various ways without deviating from the scope of the present disclosure, except as otherwise indicated. In certain embodiments, such methods may advantageously facilitate intra-appliance communication in an easy and secure manner.

At 510, the method 500 includes establishing communication between a first domestic appliance and a remote server. For instance, the communication at 510 may be established through a local wireless network, as described above. In some embodiments, 510 includes receiving a first appliance ID and a first public key of the first appliance (e.g., at the remote server). Thus, the first appliance ID and the first public key of the first appliance may be received, at least in part, through the local wireless network. At the remote server, the appliance ID or public key may be stored (e.g., temporarily).

As noted above, the appliance identifier may include a suitable device identifier (e.g., corresponding to or descriptive of an individual model or unit) and may include a universally unique identifier (UUID) associated with the corresponding appliance. Optionally, the appliance identifier may include a MAC address of the domestic appliance. Additionally or alternatively, the appliance identifier may include a device-model descriptor (e.g., model name, number, etc.) of the domestic appliance, such that descriptive information or data regarding the particular model or unit of the domestic appliance may be provided with or as the appliance identifier. Further additionally or alternatively, the appliance identifier may include a serial number of the domestic appliance (e.g., numbering or otherwise labeling the particular appliance unit).

Upon establishing communication, the first appliance may be identified as a first commissioned appliance previously associated with a user account. As an example, the appliance may locate or store the first appliance ID in a list or memory of appliances commissioned to the user account. If the first appliance is not yet commissioned or otherwise associated with the user account, commissioning may occur, as is understood.

At 520, the method 500 includes establishing communication between a second domestic appliance and the remote server (e.g., separately or independently from 510). For instance, the communication at 520 may be established through the local wireless network, as described above. In some embodiments, 520 includes receiving a second appliance ID and a second public key of the second appliance (e.g., at the remote server). Thus, the second appliance ID and the second public key of the first appliance may be received, at least in part, through the local wireless network. At the remote server, the appliance ID or public key may be stored (e.g., temporarily).

As noted above, the appliance identifier may include a suitable device identifier (e.g., corresponding to or descriptive of an individual model or unit) and may include a universally unique identifier (UUID) associated with the corresponding appliance. Optionally, the appliance identifier may include a MAC address of the domestic appliance. Additionally or alternatively, the appliance identifier may include a device-model descriptor (e.g., model name, number, etc.) of the domestic appliance, such that descriptive information or data regarding the particular model or unit of the domestic appliance may be provided with or as the appliance identifier. Further additionally or alternatively, the appliance identifier may include a serial number of the domestic appliance (e.g., numbering or otherwise labeling the particular appliance unit).

Upon establishing communication, the second appliance may be identified as a second commissioned appliance previously associated with a user account. As an example, the appliance may locate or store the second appliance ID in a list or memory of appliances commissioned to the user account. If the first appliance is not yet commissioned or otherwise associated with the user account, commissioning may occur, as is understood.

At 530, the method 500 includes transmitting the first appliance ID and the first public key to the second appliance. The same communication channel(s) used for 510 may be used at 530. Thus, the remote server (e.g., controller of the same) may transmit the received first appliance ID or first public key to the second appliance, at least temporarily, through the local wireless network. Once transmitted (e.g., in response to the same), the first public key may be deleted or otherwise removed from the remote server.

At 540, the method 500 includes transmitting the second appliance ID and the second public key to the first appliance. The same communication channel(s) used for 520 may be used at 540. Thus, the remote server (e.g., controller of the same) may transmit the received second appliance ID or second public key to the first appliance, at least temporarily, through the local wireless network. Once transmitted (e.g., in response to the same), the second public key may be deleted or otherwise removed from the remote server.

At 550, the method 500 includes generating an encryption key at the first and second public appliances. As described above, the encryption key may be independently generated at both appliances. In other words, although generation is performed separately (e.g., using separate inputs on which the encryption key is based), the same encryption key may be generated. At the first appliance, the encryption key may be based on the public key of the first appliance (e.g., first public key), the private key of the first appliance (e.g., first private key), or the public key of the second appliance (e.g., second public key). At the second appliance, the encryption key may be based on the public key of the second appliance (e.g., second public key), the private key of the second appliance (e.g., second private key), or the public key of the first appliance (e.g., first public key).

At 560, the method 500 includes directing use of the encryption key in intra-appliance communication over a secondary connection channel. The secondary channel may be apart from the local wireless network. Moreover, the secondary connection channel may be provided as or include a direct wireless connection channel (e.g., BLUETOOTH®).

In some embodiments, 560 includes establishing a direct connection between the first and second domestic appliances. Such establishing may be based on a limited or singular prompt (e.g., at one of the appliances or a remote user interface device, or from the server itself) to wirelessly connect and may be notably free of any direct user intervention or typing of a key (e.g., a public key). Thus, a direct intra-appliance connection may be made. In additional or alternative embodiments, 560 includes encrypting messages between the first and second domestic appliances according to the encryption key. In other words, and as is generally understood, each appliance may separately use the encryption key to encrypt/decrypt data or messages transmitted along the direct connection channel.

Optionally, 560 may be automatic in response 510 and 520 or 530 and 540 (e.g., directly or indirectly and following 550).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of securing communication between a first domestic appliance and a second domestic appliance through a remote server, the method comprising:
- receiving a first appliance ID and a first public key of the first domestic appliance;
- receiving a second appliance ID and a second public key of the second domestic appliance;
- transmitting the first appliance ID and the first public key to the second domestic appliance;
- transmitting the second appliance ID and the second public key to the first domestic appliance;
- generating an encryption key at the first and second appliances using the first and second public keys; and
- directing use of the encryption key in intra-appliance communication over a secondary connection channel,
- wherein the encryption key is generated independently at both the first appliance and the second appliance,
- wherein, at the first appliance, the generated encryption key is based on the first public key, a first private key of the first appliance, and the second public key, and
- wherein, at the second appliance, the generated encryption key is based on the second public key, a second private key of the second appliance, and the first public key.

2. The method of claim 1, wherein the secondary connection channel is a direct wireless connection channel.

3. The method of claim 2, wherein directing use of the encryption key in intra-appliance communication comprises
- establishing a direct connection between the first and second domestic appliances, and
- encrypting messages between the first and second domestic appliances according to the encryption key.

4. The method of claim 3, wherein directing use of the encryption key is automatic in response to transmitting the first appliance ID and the first public key to the second domestic appliance and transmitting the second appliance ID and the second public key to the first domestic appliance.

5. The method of claim 1, wherein the first appliance ID and the first public key of the first domestic appliance are received through a local wireless network, and wherein the second appliance ID and the second public key of the second domestic appliance are received through the local wireless network.

6. The method of claim 1, wherein the first appliance ID comprises a MAC address of the first domestic appliance.

7. The method of claim 1, wherein the first appliance ID comprises a device-model descriptor.

8. The method of claim 1, wherein the first appliance ID comprises a serial number of the first domestic appliance.

9. The method of claim 1, further comprising:
- identifying the first domestic appliance as a first commissioned appliance previously associated with a user account, and
- identifying the second domestic appliance as a second commissioned appliance previously associated with the user account.

* * * * *